Oct. 26, 1965 L. B. LEHMANN 3,213,498
METHOD OF STRENGTHENING GLASS ARTICLES
Filed April 17, 1963
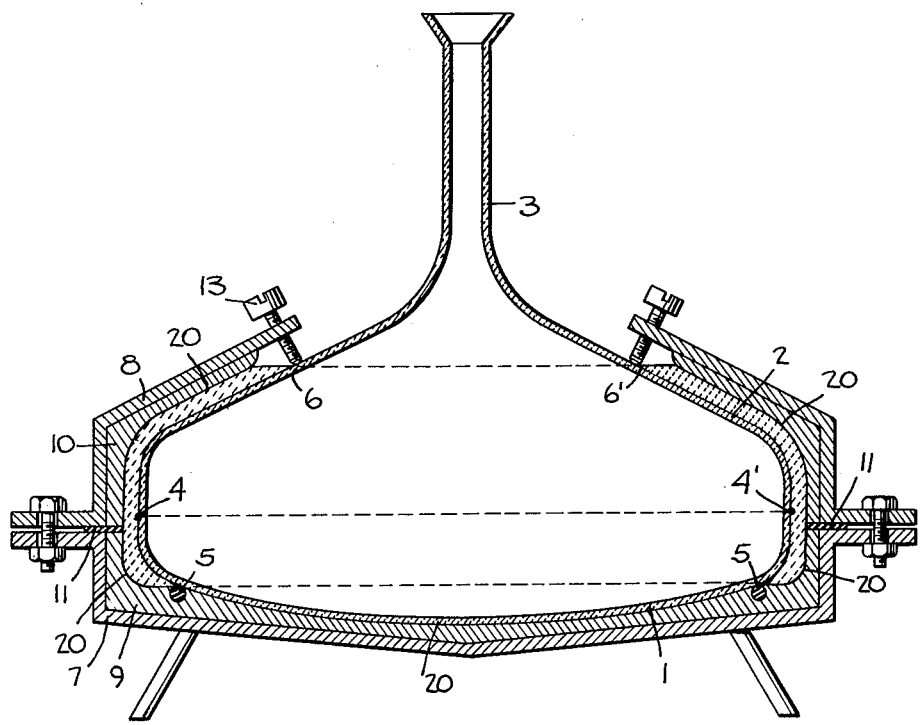
INVENTOR.
LIONEL BERTIN LEHMANN
BY
Bauer and Seymour
ATTORNEYS

United States Patent Office 3,213,498
Patented Oct. 26, 1965

3,213,498
METHOD OF STRENGTHENING GLASS ARTICLES
Lionel Bertin Lehmann, Paris, France, assignor to Compagnie de Saint-Gobain, Neuilly-sur-Seine, France
Filed Apr. 17, 1963, Ser. No. 273,594
Claims priority, application France, Apr. 27, 1962, 896,010
10 Claims. (Cl. 22—202)

This invention relates to television tubes and to glass objects having relatively sharp curvature. The invention is applicable to the strengthening of all such objects. These tubes are made of glass, they have thin walls; they have areas of sharply different radius of curvature; they frequently have areas which are almost flat and other areas which are tubular; they are sometimes put under high vacuum and while it cannot be said that they are weak, it can be said that the response of areas of dissimilar shape and curvature to applied pressures is different. When they break, as they sometimes do under long use and high vacuum, they tend to break with some violence and to project their particles with considerable velocity.

Consequently, the standard method of protecting a room against the implosion of television tubes is to incase the tube in a cabinet, except for the screen area, and cover the screen area with a tempered glass plate.

It is a primary object of this invention to produce a superior television tube. Another object of the invention is to strengthen glass bulbs or tubes, which are characterized by sharp differences in radius of curvature.

In the case of television tubes, to which this specification will be directed, in order to illustrate the invention, references may be had to the accompanying drawing which shows a vertical section through a television tube.

Television tubes are generally characterized by a screen section 1 of relatively flat curvature and long radius of curvature, by an adjoining circumference of maximum diameter which is connected to the screen by areas of sharp curvature and short radius of curvature. These parts of the tube are generally produced individually and are joined at the edge to the upper section 3 which has a narrow neck which broadens out through a conical portion to a region of maximum circumference which is fused and sealed to the screen section 1. The part of maximum circumference is joined to the conical portion by an area of relatively sharp curvature and short radius which is not, however, usually the same as the short radius of the lower section.

When breakage in such tubes occurs, it tends to occur in the areas of rapidly changing curvature at the maximum circumference where the edges of the upper and lower sections are joined. It is the protection and strengthening of this area of the tube, in particular, to which the present invention is directed.

In attacking this problem I was confronted with the facts that we were working with glass, that heat treatments affect the state and strength of the glass, and that heat treatments tend to act differently on parts of different curvature.

The objects of the invention are accomplished generally speaking by a method of strengthening a glass television tube or the like which has a great circumference marked by a circular joint and by adjacent areas of relatively great curvature which comprises casting about the great circumference at a temperature higher than its melting point a metal which has, at different temperatures, a liquid state, a solid state with internal mobility, a rigid state, and which has a contraction partially reabsorbed by creeping during cooling and hardening, and good tensile strength; and by a television tube having conjoined cone and screen sections of glass which bear an encircling hooping-ring of metal cast in situ which encompasses and covers the joint between the sections and overlaps the parts of the tube near the screen which are relatively sharply bent. The use of this kind of metal avoids the production of too great extension strains in the hooping ring as a result of its creeping characteristics during cooling which permits it to reabsorb a part of the contraction.

The process of the present invention enables the easy and economical strengthening of a television tube either before or after evacuation without preliminary machining of the glass element or of the metallic encircling hooping ring.

The strengthening of a television tube is a difficult operation because it is necessary to provide favorable strains without production of prejudicial extension strains. The essential object is to put into compression the front face or screen without localization of prejudicial strains in particular areas of the tube, for example in the angles of a tube with a rectangular viewing screen.

The strengthening process by casting in situ the metallic hooping ring according to the present invention, has the advantage that it provides distribution of the strains. It is possible to change nearly at will the form of the hooping ring in order to provide that said hooping-ring matches perfectly the form of the tube and to proportion at any point the thickness of the alloy constituting the hooping-ring to obtain the desired ratio of strains. It is also possible to proportion the hooping effect by the manner in which the operation is conducted. The main parameters are the physical properties of the alloy, Young's modulus, permanent elongation at warm state, expansion, values of the comparative expansion coefficients of glass, and alloy and controlled cooling so that the alloy controlled in such a manner that during such cooling, the alloy can creep more or less.

The invention has the further advantage that, if the melting temperature of the chosen alloy is greater than that of subsequent thermal treatments, for example the evacuation, the presence of the alloy hooping-ring encircling the tube provides protection even if the previously established strains are reduced or suppressed by the rise in temperature.

In carrying out the invention, a revetment of metal is applied to the major circumference of the glass so as to cover the sealing joint and the parts of maximum and of changing curvature which are adjacent to the joint. In its mechanical aspects, this is illustrated in the drawing wherein a two part mold is provided for the tubes 1, 2, 3, the mold being composed of a lower section 7 and an upper section 8 which are joined together by bolted flanges, not numbered. The flanges extend completely around the mold and grip between them a gasket 11 which forms a tight joint. The upper portion of the upper section of the mold carries screws 13 which can be used to hold the tube rigidly in place during the casting of the metal in the mold around the tube. The lower section of the mold is supplied with a lining 9 which is shaped to conform to the screen area of the tube. About this area a gasket 5 is provided, which prevents the metal revetment from reaching the screen of the tube. The lining 9 is formed of a product which can be poured into place and hardened there. The upper portion of the mold is also provided with the lining 10 of the same material. The easiest method of forming this lining is to employ a tube 20, similar to those which are to be strengenthened, covered in the strengthening zone with a plaster layer of convenient thickness to mount it in the mold, and to pour the hardenable material about it. A satisfactory mixer for the lining is 30 percent talc, 35 percent kaolin, 5 percent sodium or calcium silicate, and 30 percent water. After the material has hardened, the mold is opened, the tube 20 is removed and the preparation of strengthened tubes may proceed.

Assuming that a television tube is to be coated as indicated in the drawing and that this tube has curvatures as indicated, and has a seal 4–4' at its maximum circumference, the mold is taken apart, the face of the tube is mounted within the gasket 5, the mold is assembled, and the screws 13 are turned down to hold the tube in place. Under these circumstances the face of the tube is protected by the bottom of the lining and by the gasket 5, whereas a space corresponding to the volume of the plaster layer on the previous tube 20 and having that volume which is necessary to provide a revetment of adequate thickness, for example on the order of the centimeter, exists between the wall of the lining of the mold and the tube to be strengthened.

The tube, prior to its insertion in the mold, may be covered with a protective layer, for example with a layer of 20 percent talc, 20 percent kaolin, and 60 percent water.

The mold and tube are then placed, on the legs 12, in a furnace where they are heated to about 450° C. for about 3 hours. This temperature is well below the softening temperature of the glass. The assembly is then withdrawn from the furnace and placed on the legs so that the plane of joints 11 be horizontal and molten metal is poured between the tube and the spaced wall of the mold from the top and preferably simultaneously from two opposite points. This is indicated in the drawing; the metal extends from the gasket 5 at the outline of the screen to a level between the conical part 6 of the tube, covering the joint 4 and the areas of differing curvature adjacent thereto. The pouring requires a few seconds. Metal having a temperature of 700° C. may be employed without damage to the glass, and the chilling may require several minutes.

The discovery of the types of metal which could be used was a matter of some difficulty because of the strains which might be placed upon the glass during cooling by the different rates of cooling and the rates of contraction of the glass and the metal. It was finally determined that the metal must have at a lower temperature a solid state provided with internal mobility, that it must have a rigid state at yet lower temperature at which the internal mobility has disappeared, that it must have finally a resulting contraction less than its specific contractions during cooling and hardening in the mold and it must have good tensile strength. Examples of such metals are alloys known under the trademark "Zamac" of zinc, aluminum and magnesium in which the zinc is always preponderant and preferably from 93 to 96 percent, the aluminum is around 4 percent and the magnesium around .05 percent.

Another group of alloys is composition similar to the foregoing but contains from about 1 to 3 percent copper. Specific examples of these alloys are as follows:

(1) 96 percent zinc, 4 percent aluminum, .05 percent magnesium;
(2) 95 percent zinc, 4 percent aluminum, 1 percent copper and .05 percent magnesium;
(3) 93 percent zinc, 4 percent aluminum, 3 percent copper and .05 percent magnesium.

Another group of alloys are those of aluminum and silicon containing around 13 percent silicon, said alloys have a melting point at 575° C. Above 200° C. such alloy is solid but with internal mobility and becomes rigid beneath about 200° C. so that the desired strains in the glass may be obtained. They are known under the trademark "Alpax."

The tube is kept in the mold until the metal has hardened, which requires several minutes, then the mold is dismantled and the tube is in condition for use. However, it is sometimes helpful to subject the glass to annealing by carrying its temperature to 450° C. for about 30 minutes, reducing the temperature thereafter slowly and progressively to room temperature over, for example, a period of half a day. In ordinary cases a thickness of 8 mm. is satisfactory when the foregoing alloys are used.

It will be understood that the procedure which has been described can be applied to all types of bulbs or tubes prior to or after the evacuation.

*Example*

A television tube of the type which is called a 26 inch tube, having a major circumference, was put into a mold as illustrated in the drawing, and the assembly was heated to 450° C. until temperature stability has been reached, which required 3 hours. It had first been coated with the talc-kaolin composition. Having reached stable temperature it was withdrawn and molten alloy known under the trademark "Alpax" at a temperature of 700° C. was poured into the mold until it reached a level between conical part and the seal of the tube. Pouring took place at least from two opposed locations. The cooling required several minutes. After solidification, the screws were loosed and the assembly heated to 450° C. in an annealing furnace for 30 minutes and the temperature then lowered progressively to room temperature. The cooling time may be advantageously 12 hours. The tube was then removed from the mold. The hooping-ring, in these instances, was 8 mm. thick on the average, although thinner at the upper and lower edges.

Among the advantages of the new tubes are greater strength, ability to withstand handling and the shocks of transportation and manipulation, and reduced tendency for particles to fly if the tube does break.

The process is in conformity with normal glass house practice and can be worked into normal glass house routines without disturbing routines such as heating and annealing which are already established.

As many apparently widely different embodiments of the present invention may be made without departing from the spirit and scope thereof, it is to be understood that the invention is not limited to the specific embodiments.

What is claimed is:

1. A method of strengthening a glass television tube or the like which has a great circumference marked by a circular joint and by adjacent areas of relatively great curvature which comprises casting by pouring molten metal into a mould disposed about the great circumference and said adjacent areas a band of a metal which has a melting point below the softening point of the glass and which has at different temperatures a liquid state, a solid state with internal mobility, a rigid state, and which has a contraction partially reabsorbed by creeping during cooling and hardening, and good tensile strength and solidifying said metal in the form of said band, thereby putting the parts of the tube beneath the metal under compression.

2. A method according to claim 1 in which the metal is an alloy of silicon and aluminum.

3. A method according to claim 1 in which the metal is an alloy in which zinc is preponderant, which also contains a minor proportion of aluminum and of magnesium, and which may contain a minor proportion of copper.

4. A method according to claim 1 in which the metal is an alloy of silicon and aluminum containing around 13% silicon.

5. A method according to claim 1 in which the metal is an alloy containing:

around 93 to 96% zinc
around 4% aluminum
around .05% magnesium

6. A method according to claim 1 in which the metal is an alloy containing:

around 93 to 96% zinc
around 4% aluminum
around .05% magnesium
around 1 to 3% copper 7. A method of strengthening a glass television tube or the like which has a screen, a conical part, a circumferential seal, and areas of sharp curvature adjacent the largest circumference of the tube where the screen portion is sealed to the conical portion, said method comprising the steps of placing about the tube a mold covering the seal between cone and screen, the largest circumference, and the adjacent areas of sharp curvature, preheating the mold and tube to a temperature below the softening point of the glass, pouring into the mold a melted metal at a temperature below the softening point of the glass and which has at different temperatures a liquid state, a solid state with internal mobility, and a rigid state, which has a contraction partially reabsorbed by creeping during cooling and hardening, and good tensile strength when cooled and hardened, and after the metal has hardened to its rigid state removing the mold from the tube and band, thereby putting the parts of the tube beneath the metal under compression.

8. A method according to claim 7 which, after the metal has hardened to its rigid state, includes reheating the tube to anneal the glass, and then cooling it slowly to room temperature.

9. A method according to claim 7 in which the metal is an alloy of silicon and aluminum containing around 13% silicon.

10. A method according to claim 7 in which the metal is an alloy containing:

> around 93 to 96% zinc
> around 4% aluminum
> around .05% magnesium

References Cited by the Examiner

UNITED STATES PATENTS

| | | | |
|---|---|---|---|
| 397,641 | 1889 | Halford | 220—2.1 |
| 1,325,725 | 12/19 | Kohler | 22—192 |
| 1,955,981 | 4/34 | Smith | 22—202 |
| 2,004,784 | 6/35 | Evans | 22—202 |
| 2,075,090 | 3/37 | Bonsack | 75—148 |
| 2,785,820 | 3/57 | Vincent et al. | 220—2.1 |
| 3,013,117 | 12/61 | Nichol. | |

FOREIGN PATENTS 514,292   11/39   Great Britain.

J. SPENCER OVERHOLSER, *Primary Examiner.*

GEORGE O. RALSTON, *Examiner.*